United States Patent

Kaneda

(10) Patent No.: US 10,212,309 B2
(45) Date of Patent: Feb. 19, 2019

(54) PRINTING DEVICE, PRINTING METHOD, AND STORAGE MEDIUM, FOR ROTATING IMAGE DATA

(71) Applicant: CANON KABUSHIKI KAISHA, Tokyo (JP)

(72) Inventor: Takeshi Kaneda, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/414,162

(22) Filed: Jan. 24, 2017

(65) Prior Publication Data

US 2017/0223225 A1 Aug. 3, 2017

(30) Foreign Application Priority Data

Jan. 29, 2016 (JP) ................................ 2016-016361

(51) Int. Cl.
| G06F 15/00 | (2006.01) |
| G06F 1/00 | (2006.01) |
| G06K 15/00 | (2006.01) |
| H04N 1/387 | (2006.01) |
| G06K 15/02 | (2006.01) |
| H04N 1/00 | (2006.01) |
| G06F 3/12 | (2006.01) |
| G06K 1/00 | (2006.01) |

(52) U.S. Cl.
CPC ......... *H04N 1/3877* (2013.01); *G06K 15/021* (2013.01); *H04N 1/0044* (2013.01); *H04N 1/00307* (2013.01); *G06K 2215/0097* (2013.01); *H04N 2201/0055* (2013.01); *H04N 2201/0082* (2013.01)

(58) Field of Classification Search
CPC ............ H04N 1/3877; H04N 1/00307; H04N 1/0044; H04N 2201/0055; H04N 2201/0082; G06K 15/021; G06K 2215/0097
USPC .............................. 358/1.18, 1.13, 1.14, 1.1
See application file for complete search history.

(56) References Cited

U.S. PATENT DOCUMENTS

| 8,462,378 B2 * | 6/2013 | Takeda ................... G03G 15/36 345/629 |
| 2009/0040547 A1 * | 2/2009 | Ferlitsch ............... G06F 3/1208 358/1.15 |

FOREIGN PATENT DOCUMENTS

JP  2015-24507 A  2/2015

* cited by examiner

*Primary Examiner* — Douglas Tran
(74) *Attorney, Agent, or Firm* — Canon USA, Inc., IP Division

(57) ABSTRACT

A printing device displays a preview image of received image data, receives, based on the previewed image, an instruction to rotate the received image, rotates the received image data based on the received rotation instruction, and prints the rotated image data.

29 Claims, 8 Drawing Sheets

FIG.5
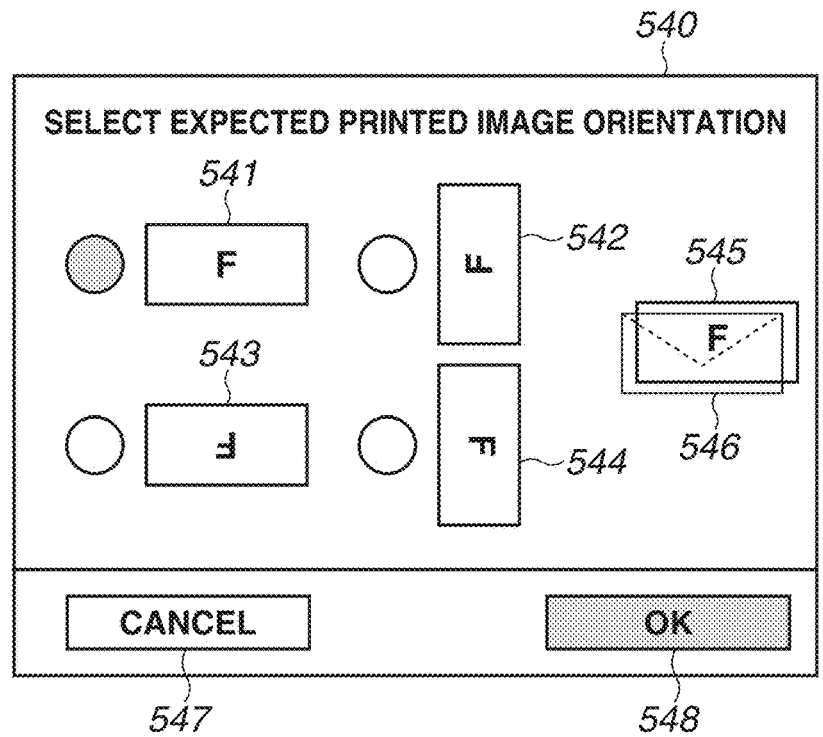
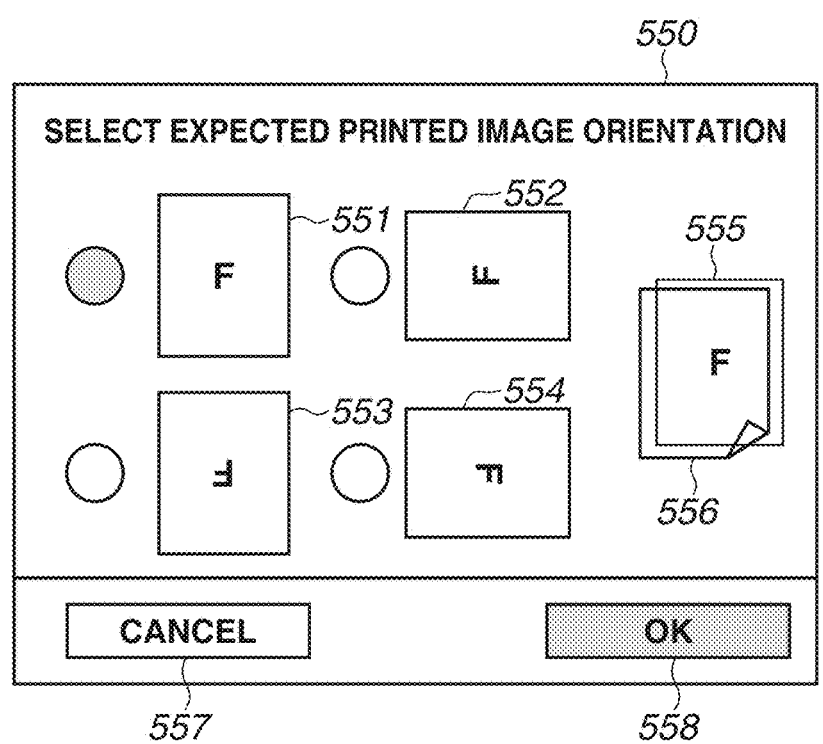

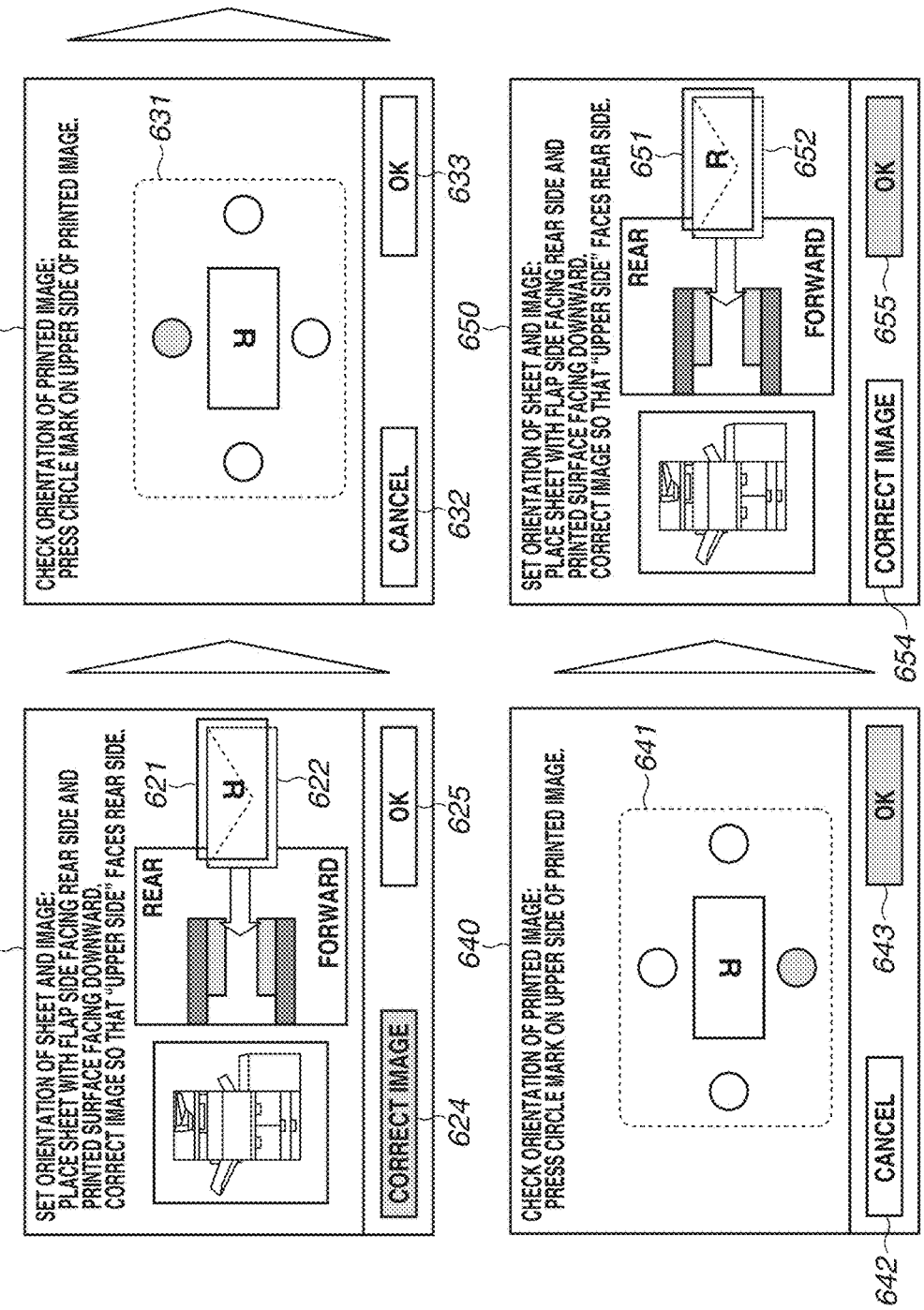

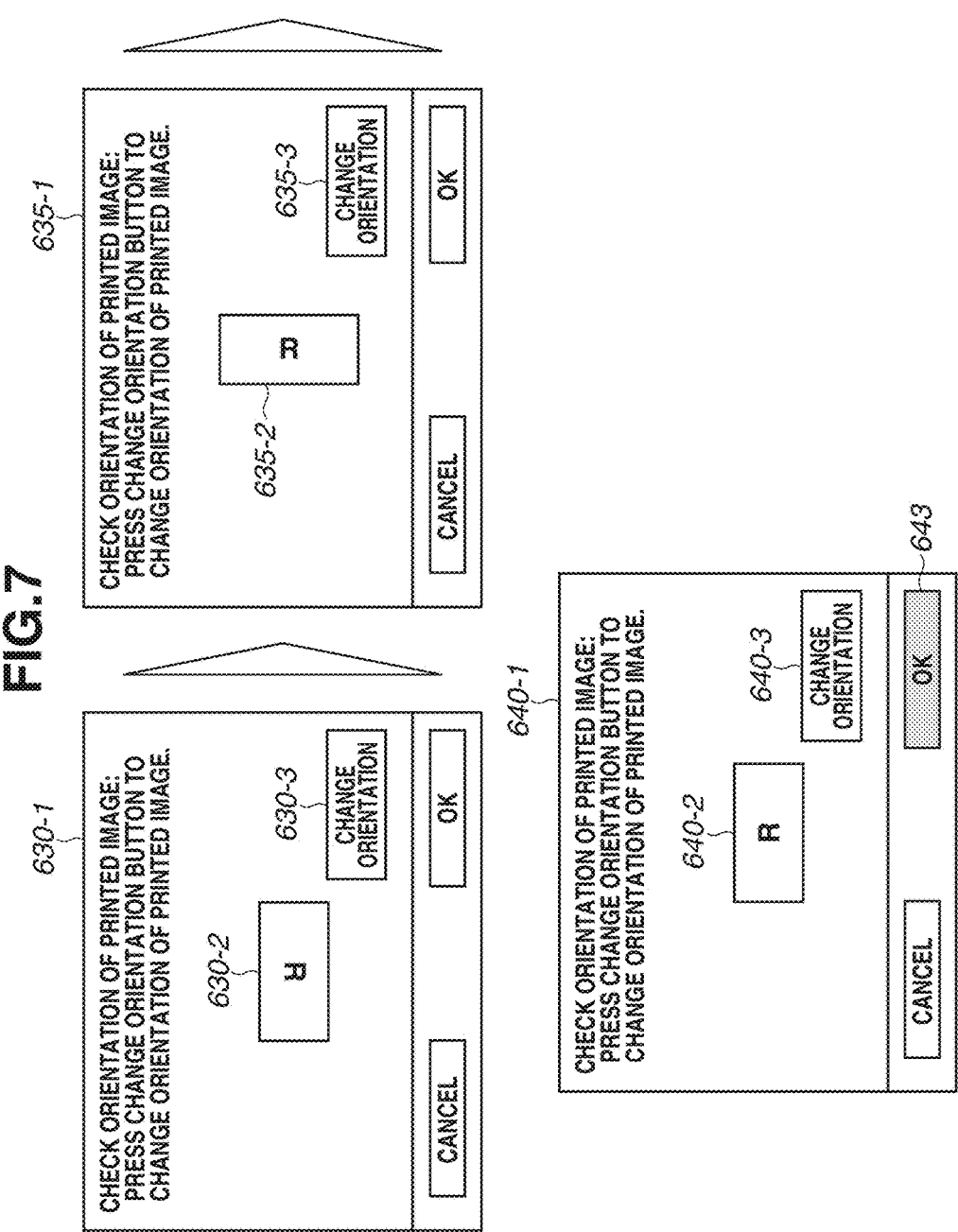

FIG.8
TABLE 1

| EXTERNAL DEVICE | INFORMATION PROCESSING DEVICE 105 | | TABLET 103 | | CONVERSION SERVER 111 | | SMARTPHONE 104 | |
|---|---|---|---|---|---|---|---|---|
| PRINT APPLICATION | PRINTER DRIVER | | APP-A | | APP-B | | APP-C | APP-D |
| COMMUNICATION PROTOCOL | LPR/RAW | | IPP | | HTTP/XMPP | | WSD | |
| DATA FORMAT | PCL | PS | PDF | PWG | PDF | PWG | XPS | PWG |
| TOP-BOTTOM INFORMATION | INCLUDED | INCLUDED | INCLUDED | NOT INCLUDED | INCLUDED | NOT INCLUDED | INCLUDED | NOT INCLUDED |
| RELIABILITY | HIGH | HIGH | LOW | — | LOW | — | HIGH | — |
| PROCESSING EXECUTED AS A RESULT OF DETERMINATION IN S4005 IN FIG. 4 | S4009 | S4009 | S4006 | S4006 | S4006 | S4006 | S4009 | S4006 |

PRINTING DEVICE, PRINTING METHOD, AND STORAGE MEDIUM, FOR ROTATING IMAGE DATA

BACKGROUND

Field

The present disclosure relates to a print processing technique for rotating image data.

Description of the Related Art

Processing executed in a printing device includes processing for rotating image data in conjunction with a print medium, e.g., a sheet, including an envelope. A user selects a top, i.e., in an upward and downward direction of an image and also referred to as a "top-bottom direction", of the image data by using an image editing application, etc . . . A printer driver transmits the image data including information, i.e., top-bottom information, indicating the selected top, to a printing device. A printing device discussed in Japanese Patent Application Laid-Open No. 2015-24507 analyzes the received image data to acquire the top-bottom information. The printing device rotates the image data to match the orientation of the image indicated by the top-bottom information with the orientation of the sheet, e.g., a side of a flap of the envelope.

Mobile terminals such as smartphones are widely used, and now some printing devices can print images based on the image data transmitted from mobile terminals. Unfortunately, some applications operating in the mobile terminals do not have a function enabling a user to select the top of the image data, or for transmitting the image data including the information indicating the top of the image data to the printing device. Thus, the printing device can receive the image data including the top-bottom information indicating a direction undesired by the user, or image data that does not even include top-bottom information. Such inaccuracy or absence of the top-bottom information makes it difficult to appropriately rotate the image data to match the orientation of the sheet the image data is to be printed on.

SUMMARY

Aspects of embodiments are directed to providing a printing device that can print image data received from a mobile terminal by rotating the image data to an appropriate orientation, even if the data includes inaccurate top-bottom information or no top-bottom information.

According to embodiments, a printing device configured to print image data transmitted from a mobile terminal includes a receiving unit configured to receive the image data, a display unit configured to display a preview image of the received image data, a reception unit configured to receive, based on the displayed preview image, an instruction to rotate the received image data, a rotation unit configured to rotate the received image data based on the received rotation instruction, and a print unit configured to print the rotated image data.

Further features will become apparent from the following description of exemplary embodiments with reference to the attached drawings.

BRIEF DESCRIPTION OF THE DRAWINGS

FIG. 5 illustrates a user interface (UI) screen for setting an initial value of top-bottom information according to the exemplary embodiment.

FIG. 6 illustrates a UI screen for correcting the top-bottom information according to the exemplary embodiment.

FIG. 7 illustrates a UI screen for correcting top-bottom information according to another exemplary embodiment.

FIG. 8 is a diagram illustrating a table for determining whether top-bottom information for an image to be printed is included and is reliable.

DESCRIPTION OF THE EMBODIMENTS

An exemplary embodiment is described below with reference to the drawings.

<Description on System According to Present Exemplary Embodiment>

Figure 1:
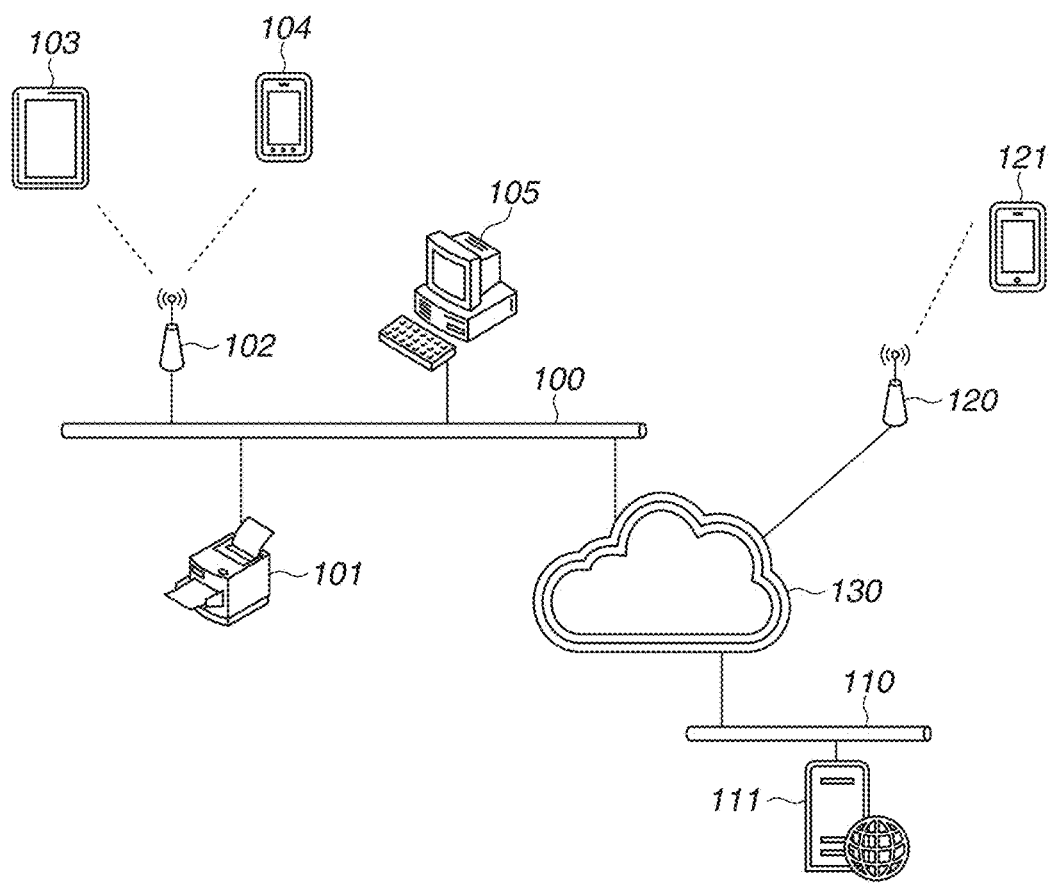
FIG. 1 is a diagram illustrating a system according to an exemplary embodiment.

FIG. 1 is a diagram illustrating a configuration of a system according to the present exemplary embodiment.

An image forming device 101, i.e., a printing device, a wireless local area network (LAN) access point 102, and an information processing device 105 are connected to a LAN 100. The image forming device 101 includes a printing function. The wireless LAN access point 102 enables access to the LAN 100. Mobile terminals, such as a tablet computer (hereinafter, referred to as a tablet) 103 and a smartphone 104, are connected to the LAN 100 via the wireless LAN access point 102. The LAN 100 is connected to a public line 130, such as the Internet. Thus, communications with a 3G/Long Term Evolution (LTE) line base station 120 and a print data conversion server 111 (hereinafter, referred to as a conversion server 111) connected to a LAN 110 can be performed through the Internet. The LAN 110 is connected to the Internet line 130. The conversion server 111 includes a global Internet protocol (IP) address accessible from the Internet 130. A smartphone 121 is connected to the 3G/LTE line base station 120, and can access the conversion server 111 on the LAN 110 through the Internet line 130.

The information processing device 105 includes a printer driver, as a print application, for the image forming device 101. The information processing device 105 uses the printer driver to generate image data as a print target, including image data written in a Page Description Language (PDL), and transmits the image data to the image forming device 101.

The tablet 103, the smartphone 104, and the conversion server 111 each have the following print application different from the printer driver. More specifically, one print application can be provided as one function of an operating system (OS) of external devices such as the tablet 103 and the smartphone 104, and another application can be provided as one function of a print service provided by an external device such as the conversion server 111. Table 1 in FIG. 8 illustrates differences between such print applications and the printer driver.

As illustrated in this Table 1, the information processing device 105 uses the printer driver to transmit the image data to the image forming device 101. The tablet 103 includes a print application APP-A, and uses the print application APP-A to transmit the image data to the image forming device 101. The smartphone 121 transmits the image data to the image forming device 101 through wireless communications via the conversion server 111. The conversion server 111 includes a print application APP-B. When the smartphone 121 transmits the image data to the conversion server 111 through the wireless communications, the conversion server 111 uses the print application APP-B to transmit (transfer) the image data to the image forming device 101. Another smartphone 104 includes print applications APP-C and APP-D, and uses the print application APP-C or APP-D to transmit the image data to the image forming device 101 through the wireless communications.

The image data transmitted to the image forming device 101 by the printer driver includes top-bottom information indicating the top of the image selected by the user using an image editing application. Thus, the reliability of the top-bottom information included in the image data transmitted from the printer driver is expected to be relatively high. The print applications different from the printer driver do not include a function enabling the user to select the top of an image and transmitting the image data including the top-bottom information. Thus, the print applications either transmit image data including top-bottom information with relatively low reliability or do not transmit any top-bottom information to the image forming device 101.

The image forming device 101 according to the present exemplary embodiment determines whether the received image data includes the top-bottom information or determines whether the reliability of the top-bottom information included in the image data is relatively low or high, based on the type of a communication protocol and the type of a data format of the image data. The image forming device 101 enables the user to select the top of the image upon receiving the image data including top-bottom information with relatively low reliability or image data that does not include any top-bottom information. When the user is able to select the top of the image, it is also referred to as setting the top of the image data based on an instruction from the user.

<Description of each Hardware Component>

Figure 2:
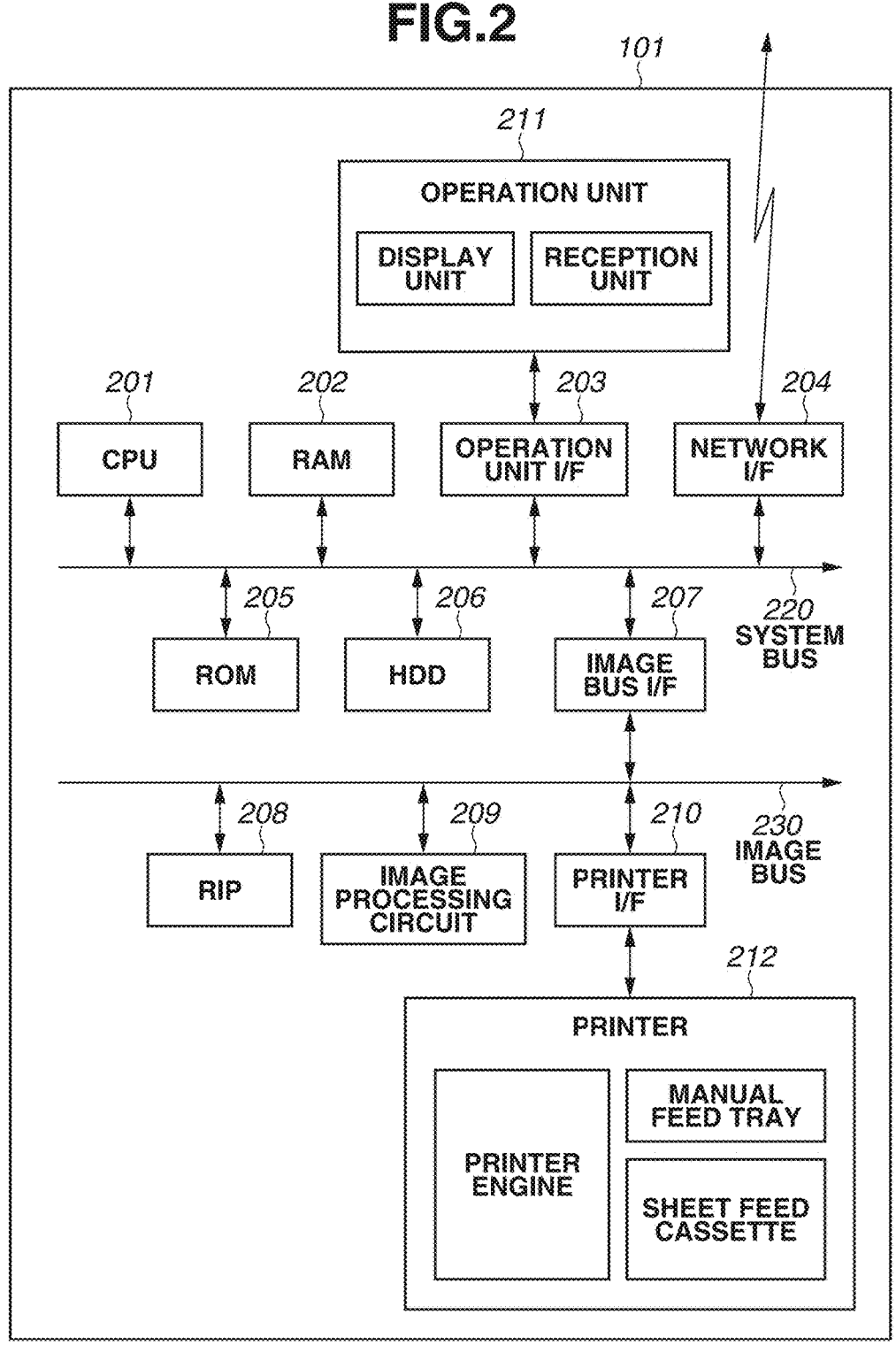
FIG. 2 is a diagram illustrating a hardware configuration of an image forming device.

FIG. 2 is a hardware block diagram of the image forming device 101 according to the present exemplary embodiment.

The image forming device 101 includes hardware components 201 to 230.

A central processing unit (CPU) 201, a random access memory (RAM) 202, an operation unit interface (I/F) 203, a network I/F 204, a read only memory (ROM) 205, a hard disk drive (HDD) 206, and an image bus I/F 207 are connected to a system bus 220. These components communicate with each other via the system bus 220, and communicate with a raster image processor (RIP) 208, an image processing circuit 209, and a printer I/F 210 connected to an image bus 230, via the image bus I/F 207.

Figure 3:
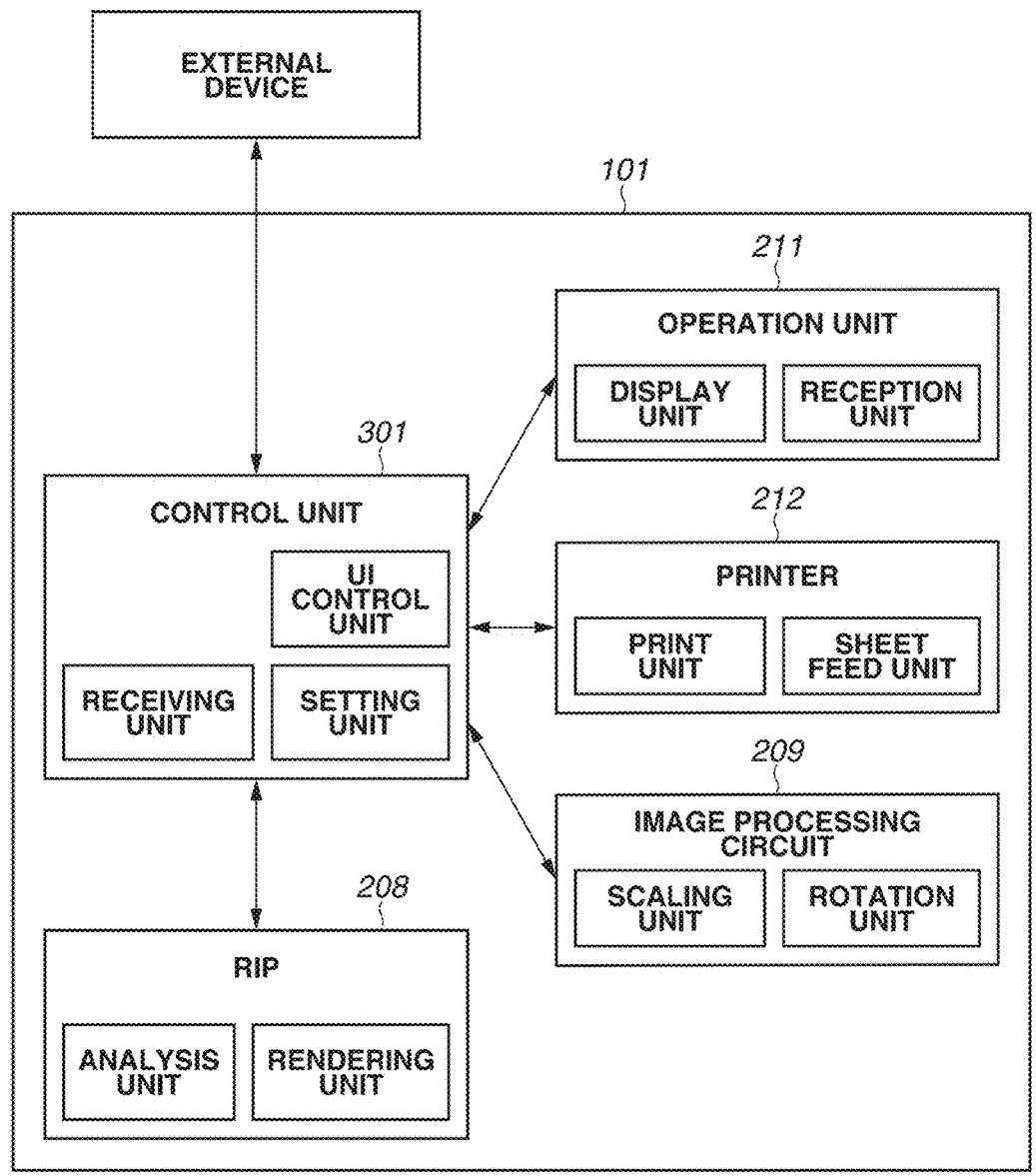
FIG. 3 is a block diagram illustrating a system of the image forming device.

The ROM 205 stores various parameters required for starting the image forming device 101 and executing operations therein, and a program executed by the CPU 201 for implementing a system with a control unit 301 as a main component as illustrated in FIG. 3.

The CPU 201 includes at least one processor. The CPU 201 executes a program stored in the ROM 205 to perform overall control on the components illustrated in FIG. 2. The control unit 301 illustrated in FIG. 3 is implemented when the CPU 201 executes the program. More specifically, the CPU 201 executing the program and the components controlled by the CPU 201 functions as the control unit 301. The controlled components include the RAM 202, the operation unit I/F 203, the network I/F 204, the ROM 205, the HDD 206, the image bus I/F 207, the printer I/F 210, the system bus 220, and the image bus 230.

The RAM 202 temporarily stores data and information processed by the components, under the control of the CPU 201. The HDD 206 serves as a storage area of the image data (hereinafter, referred to as PDL data) received via a network, and temporarily stores data and information after the processing by the RIP 208 and the image processing circuit 209, under the control of the CPU 201. When data and information are stored in the RAM 202 and the HDD 206 under the control of the CPU 201, it is referred to as the storing of data and information by the control unit 301.

An operation unit 211 includes a touch screen functioning as both a display unit that displays information, such as an image, and a reception unit that receives an operation and an instruction from a user. The operation unit 211 communicates with the CPU 201 via the operation unit I/F 203. The CPU 201 transmits information to be displayed on the display unit to the operation unit 211 via the operation unit I/F 203. The operation unit 211 notifies the CPU 201 of the information received from the user via the operation unit I/F 203.

The network I/F 204 receives the PDL data from an external device, i.e., the information processing device 105, the tablet 103, the smartphone 104, or the conversion server 111, through the network, such as a LAN, and stores the PDL data in the HDD 206 under the control of the CPU 201.

The image bus I/F 207 connects between the system bus 220 and the image bus 230, and relays data between a system bus 220 side on which the components for control system operate and an image bus 230 side on which the components for image processing system operate. The image bus I/F 207, the RIP 208, the image processing circuit 209, and the printer I/F 210 are connected to the image bus 230.

The RIP 208 includes at least one processor, and generates raster image data (hereinafter, referred to as a raster image) such as a bitmap based on the PDL data. The raster image thus generated is stored in the RAM 202.

The image processing circuit 209 executes image processing on the raster image. The image processing includes color conversion processing, rotation processing, reduction processing, and gamma correction. The raster image subjected to the image processing is transmitted to the printer 212 via the printer I/F 210, and can also be displayed on the operation unit 211. The printer I/F 210 notifies the printer 212 of information about the type, e.g., an envelope, a postcard, A4 paper, etc., of a print medium (hereinafter, referred to as a sheet) set by the CPU 201 (control unit 301).

The printer 212 includes a printer engine and a sheet feeder (not illustrated). The printer engine prints an image, based on the raster image received via the printer I/F 210, on a sheet and can employ electrophotography, inkjet printing, or any other printing method. The sheet feeder includes a plurality of sheet feed cassettes and a manual feed cassette. Each of the plurality of sheet feed cassettes, e.g., cassettes 1 to 5, feeds sheets, e.g., A4 paper, stored therein to the printer engine. The manual feed tray feeds sheets, e.g., an envelope or a postcard, placed on the tray by the user, to the printer engine. The sheet feed cassette is also referred to as a sheet feed stage. Each of the sheet feed cassettes is associated with information on a single type, e.g., A4 size normal paper, of sheet.

<System Configuration of Image Forming Device>

FIG. 3 is a block diagram illustrating a system configuration of the image forming device 101 according to the present exemplary embodiment. The system of the image forming device 101 includes the control unit 301, the RIP 208, the image processing circuit 209, the operation unit 211, and the printer 212.

The control unit 301 includes a receiving unit, a user interface (UI) control unit, and a setting unit. The receiving unit receives the PDL data from the external device via the network I/F 204. The receiving unit also determines the communication protocol used when the PDL data is received and the data format of the PDL data, and stores information indicating the protocol and the data format. Examples of the communication protocol include six types of protocols: Line Printer Remote (LPR), RAW, Internet Printing Protocol (IPP), Hypertext Transfer Protocol (HTTP), Extensible Messaging and Presence Protocol (XMPP), and Web Services For Devices (WSD) illustrated in Table 1 in FIG. 8. The data format includes, as examples, five types of formats: Point Cloud Library (PCL), PostScript, Portable Document Format (PDF), Printer Working Group (PWG) raster, and Extensive Markup Language Paper Specification (XPS), which are also illustrated in Table 1.

The UI control unit controls a content to be displayed on the display unit of the operation unit 211 via the operation unit I/F 203, and acquires information about the operation and instruction received by the reception unit of the operation unit 211 from the user. The setting unit sets the type of a sheet on which an image is printed, the orientation of the sheet conveyed to the printer engine from a sheet feed cassette, and the top of the image to be printed.

The control unit 301 instructs the RIP 208, the image processing circuit 209, and the printer 212 via the image bus I/F 207, the image bus 230, and the printer I/F 210 to execute relevant processing, and also transmits and receives data to and from these components.

The RIP 208 includes an analysis unit that analyzes the PDL data, and a rendering unit that generates the raster image based on the result of the analysis. The analysis unit acquires attribute information in the PDL data in the course of the analysis processing on the PDL data stored by the control unit 301, and notifies the control unit 301 of the attribute information. The attribute information includes type information and top-bottom information. The type information indicates the type of a sheet on which the image is printed, e.g., an A4 size normal paper, an A4 size coated paper, an A3 size normal paper, an envelope, or a postcard. The top-bottom information indicates the top of the image to be printed. The control unit 301 stores the notified attribute information. The analysis on the PDL data is also referred to as interpretation of the PDL data. The rendering unit transmits the generated raster image to the control unit 301. The control unit 301 stores the raster image transmitted thereto.

The image processing circuit 209 includes a scaling unit, a rotation unit, a color conversion unit (not illustrated), and a gamma correction unit (not illustrated) that execute corresponding image processing on a raster image stored by the control unit 301. The scaling unit enlarges or reduces the raster image to convert the resolution of the image. The rotation unit rotates the raster image based on the set top and the orientation of the sheet.

The operation unit 211 includes a display unit that displays the information notified from the control unit 301 as an image and the reception unit that receives an operation/instruction from the user and notifies the control unit 301 of the operation/instruction.

The printer 212 includes a sheet feed unit that feeds a sheet of the type notified from the control unit 301 and a print unit that prints the image based on the raster image stored by the control unit 301, on the sheet thus fed.

<Print Processing>

Figure 4:
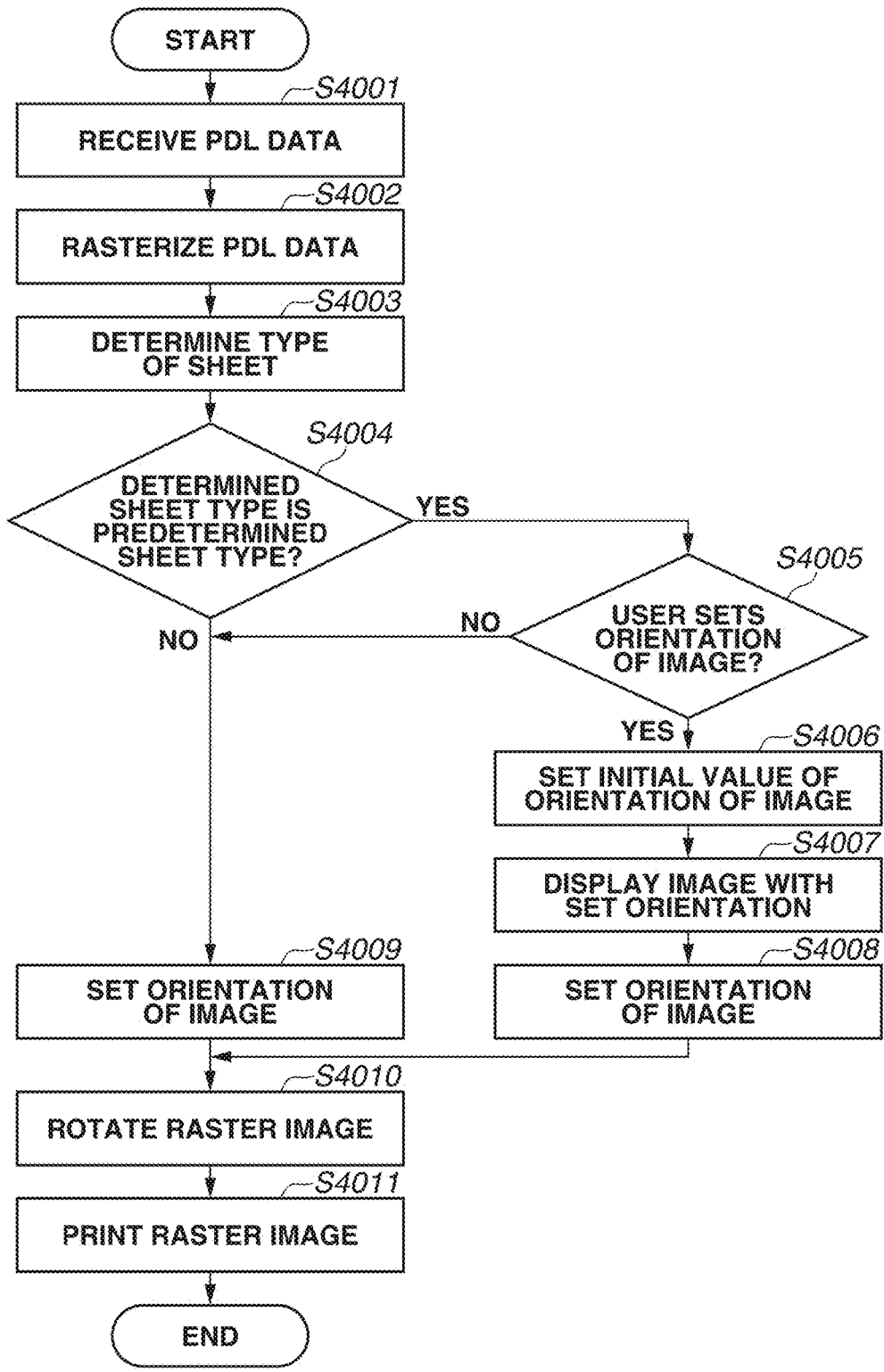
FIG. 4 is a flowchart according to the exemplary embodiment.

FIG. 4 is a flowchart illustrating print processing. The components illustrated in FIG. 3 cooperate under the control of the control unit 301 to execute the processing in the flowchart.

In step S4001, the receiving unit of the control unit 301 receives the PDL data from the external device and stores the PDL data. The reception unit determines the communication protocol used when the PDL data is received and the data format of the PDL data, and stores information indicating the protocol and the data format.

In step S4002, the analysis unit of the RIP 208 analyzes the PDL data stored by the control unit 301, and generates, based on the result of the analysis intermediate data of a format that can be rasterized by the rendering unit. When the result of the analysis indicates that the PDL data includes the type information about the sheet, the analysis unit notifies the control unit 301 of the type information. When the PDL data includes the top-bottom information, the analysis unit also notifies the control unit 301 of the top-bottom information. The control unit 301 stores the notified type information and the top-bottom information. The rendering unit then rasterizes the generated intermediate data to generate the raster image, and the control unit 301 stores the generated raster image.

In step S4003, the setting unit of the control unit 301 determines, based on the type information about the sheet stored as described above, the type of the sheet on which the image is printed and selects the sheet feeder, i.e., the sheet feed cassettes or the manual feed tray, that stores the sheet of the determined type. For example, the setting unit selects the cassette 1 as the sheet feeder when the type information indicates "A4 size normal paper". When the type information indicates "envelope" or "postcard", the setting unit selects the manual feed tray as the sheet feeder. If the PDL data includes no type information, the setting unit selects a predetermined sheet feed cassette, e.g., the cassette 1, as the sheet feeder. Alternatively, the setting unit can enable the user to select the sheet feeder via the operation unit 211 if the PDL data includes no type information.

In step S4004, the setting unit of the control unit 301 determines whether the sheet type determined in step S4003 is a specific sheet type. When the set sheet type is determined to be the specific sheet type (YES in step S4004), the processing proceeds to step S4005. When the set sheet type is determined not to be the specific sheet type (NO in step S4004), the processing proceeds to step S4009. The specific sheet type is a sheet that includes additional limitations. More specifically, the sheet is of the specific type when the orientation of the image to be printed is relatively limited with respect to the orientation of sheet being fed in printing. For example, the specific sheet type indicates an envelope and a postcard. The envelope and the postcard are relatively limited compared with the A4 or A3 size normal paper because of the following reason. When the image is printed on an envelope, the image is required to rotate to match a position and a side of the envelope where the flap is provided. When the image is printed on a postcard, the image is required to rotate to match the position of the area code section and the orientation of the postcard. When the image is printed on the envelope or the postcard without considering the position of the flap, the area code section, or the like, the image can be printed upside down relative to the orientation of the envelope or the postcard, i.e., the orientation of the print medium.

In step S4005, the setting unit of the control unit 301 determines, based on the user instruction, whether to set the top of the image to be printed. When the top of the image is determined to be set based on the user instruction (YES in step S4005), the processing proceeds to step S4006. When the top of the image is determined not to be set based on the user instruction (NO in step S4005), the processing proceeds to step S4009. The determination made by the setting unit in this step is based on at least one of (1) whether the PDL data includes the top-bottom information, (2) the communication protocol stored in step S4001, or (3) the data format stored in step S4001. The determination is described with reference to Table 1 in FIG. 8. Here, the setting unit functions as a controller that at least performs control to determine whether to display a preview image and to receive an image rotation instruction as described below.

The setting unit determines to set the top of the image based on the user instruction when no top-bottom information is stored, i.e., when the PDL data includes no top-bottom information.

Conversely, when the top-bottom information is stored, i.e., when the PDL data includes the top-bottom information, the setting unit determines whether to set the top of the image based on the user instruction according to the communication protocol and/or the data format as described below.

When the communication protocol is LPR or RAW, the setting unit determines not to set the top of the image based on the user instruction due to the following reason. When the communication protocol is LPR or RAW, the print application that generated the PDL data is presumably the printer driver, and the PDL data transmitted from the printer driver presumably includes the top-bottom information appropriately set by the user, which means the included top-bottom information has high reliability.

When the communication protocol is IPP, the setting unit determines to set the top of the image based on the user instruction for the following reason. When the communication protocol is IPP, an environment for generating the PDL data, e.g., the OS or the print application APP-A of the tablet 103, presumably does not provide the function of enabling the user to set the top of the image. Thus, even when the PDL data is in a data format such as PDF, with which the top-bottom information is settable, the orientation of the image indicated by the top-bottom information presumably is not desired by the user. Thus, the reliability of the top-bottom information is low. However, the top of the image can be set based on the user instruction when the data format is PDF or PWG raster regardless of whether the communication protocol is IPP. Alternatively, the top of the image can be set based on the user instruction when the communication protocol is IPP and the data format is PDF or PWG raster. More specifically, the determination can be made based on a combination of the communication protocol and the data format.

When the communication protocol is HTTP or XMPP, the setting unit determines to set the top of the image based on the user instruction for the same reason as the case where the communication protocol is IPP. More specifically, the environment for generating the PDL data, e.g., the OS of the smartphone 121, the OS or the print application APP-B of the conversion server, presumably provides the function of enabling the user to set the top of the image. Thus, the reliability of the top-bottom information is low. However, the top of the image can be set based on the user instruction when the data format is PDF or PWG raster regardless of whether the communication protocol is HTTP or XMPP. Alternatively, the top of the image can be set based on the user instruction when the communication protocol is HTTP or XMPP and the data format is PDF or PWG raster. More specifically, the determination can be made based on a combination of the communication protocol and the data format.

When the communication protocol is WSD and the data format is XPS, the setting unit determines not to set the top of the image based on the user instruction. When the communication protocol is WSD and the data format is PWG, the setting unit determines to set the top of the image based on the user instruction for the following reason. When the communication protocol is WSD, whether the PDL data is generated in an environment enabling or not enabling the user to set the top of the image cannot be determined. For example, the environment enabling the user to set the top of the image is an environment using the print application APP-C, and the environment not enabling the user to set the top of the image is an environment using the print application APP-D. Thus, the setting unit makes a determination based on whether the communication protocol is WSD, and also by referring to the data format of the PDL data.

The processing in the flowchart is further described below.

In step S4006, the setting unit sets an initial value (initial rotation angle) of the top of the image to be printed. The initial value is set for each type of sheet. The initial value of the top of the image is described with reference to FIG. 5. In this description, the initial value is set in advance by the user before the PDL data is received. However, the embodiment is not limited to this, and the initial value can be set when the processing in step S4006 starts.

FIG. 5 illustrates screens 540 and 550 displayed on the display unit by the UI control unit. The screen 540 is used for setting the initial value of the top of an image when the image is printed on an envelope. Similarly, the screen 550 is used to set the initial value of the top of an image when the image is printed on an A4 size normal paper. The screen 550 is similar to the screen 540 and thus the description thereof is omitted.

Images 541 to 544 displayed on the screen 540 each indicate an expected top, i.e., upper side of the image, of the input image. Each of the images 541 to 544 includes a letter "F". The upper side of the letter "F" represents the side regarded as the top of the input image. Thus, the image 541 indicates that the initial value, i.e., initial rotation angle, is set to a rotation angle 0°, so that the upper side of the image to be input is regarded as the top. In other words, the image 541 is designated by the user desiring to obtain an image with a correct orientation by rotating the input image by the initial angle (0°) in the counterclockwise direction, that is, without rotation.

The image 542 indicates that the initial value. i.e., initial rotation angle, is set to a rotation angle of 270°, so that the left side of the input image is regarded as the top. In other words, the image 542 is designated by the user desiring to obtain the image in a correct orientation by rotating the input image by 270° in the counterclockwise direction.

Similarly, the image 543 indicates that the initial value, i.e., initial rotation angle, is set to a rotation angle of 180°, so that the lower side of the input image is regarded as the top. The image 544 indicates that the initial value, i.e., initial rotation angle, is set to a rotation angle of 90°, so that the right side of the input image is regarded as the top.

The image 545 indicates the orientation of the sheet onto which the input image is to be printed. The image 545 indicates that an envelope is placed on the manual feed tray with the flap disposed on the upper (rear) side. The user can designate the expected top of the input image, while checking the orientation, i.e., the side of the flap, of the sheet indicated by the image 545.

On the screen 540, the image 541 is designated by the user. Thus, the initial value of the orientation of the image is set to the initial rotation angle (0°) so that the upper side of the input image is regarded as the top. Thus, when the PDL data actually input includes no top-bottom information and when the corresponding image is upside down considering what is expected by the user, the orientation of the image to be printed is upside down. Thus, the user sets the orientation of the image in subsequent processing.

The processing in the flowchart is further described.

In step S4007, the scaling unit of the image processing circuit 209 performs resolution conversion, i.e., enlarging/reducing, on the raster image in accordance with the resolution of the display unit so that the raster image generated in step S4002 can be displayed on the display unit of the operation unit 211 as a preview. In the description below, the raster image is assumed to be reduced, and the reduced raster image is simply referred to as a downsized version or is referred to as thumbnail. The rotation unit of the image processing circuit 209 rotates the downsized version based on the initial value, i.e., initial rotation angle, of the top of the image set by the setting unit.

The UI control unit of the control unit 301 displays, on the display unit of the operation unit 211, information, e.g., an image indicating the orientation of the sheet such as an envelope or a letter, necessary for the user to check the top of the image, together with the downsized version. FIG. 6 illustrates a screen 620 as an example of the screen displayed on the display unit in this process.

The screen 620 displays an image 621 and an image 622. The image 621 is a preview image of the raster image, and indicates the print orientation of the raster image. Here, an image including a letter "R" is regarded as the image obtained by the rasterization. The image 621 is an image obtained by rotating the downsized version of the raster image including the letter "R" in accordance with the initial value of the top of the image. Thus, the upper side of the image 621 is regarded as the top of the image. In other words, the image 621 indicates that the lower side of the letter "R" is regarded as the top of the raster image, i.e., upper side of the raster image. Thus, the raster image is in an upside-down state with the top and the bottom, i.e., upper and lower sides rotated 180° relative to the correct orientation. The image 622 is an image displayed to indicate the orientation of the "envelope" as the sheet on which the image is printed. Since the image 621 and the image 622 are displayed together, the user can intuitively recognize the print orientation of the image relative to the sheet. By nature, the printing of the letter "R" is to be performed with the envelope with the orientation in agreement with each other. However, the screen 620 indicates that the letter "R" is printed upside down relative to the envelope.

Thus, the present exemplary embodiment provides a way to adjust the setting of the top of the image to correct its orientation. When correcting the setting of the top of the image, the user presses a "correct image" button 624 in the screen 620 (reception unit). The UI control unit detects the pressing and displays a screen 630 on the display unit. When an "OK" button 625 is pressed, the UI control unit stops displaying the screen 620, and the processing proceeds to step S4008.

The user designates the upper side of the image to be printed, i.e., orientation of the image for the reception unit of the operation unit 211, while monitoring the screen 630. The orientation thus designated is regarded as the top of the image designated by the user. The reception unit that received the designation of the orientation of the image from the user notifies the UI control unit of the control unit 301 of the information indicating the orientation. The setting unit of the control unit 301 updates the orientation of the image that has been set, with the designated orientation. In other words, the setting unit sets the designated orientation as the orientation of the image. i.e., the top of the image. The screen 630 displays a downsized version of the raster image rotated in accordance with the initial value on a screen area 631 similar to the image 621. The downsized version is an image with the top and bottom reversed, i.e., the letter "R" is upside down, as described above. The screen area 631 displays not only the downsized version with the top and bottom reversed, but also four circle marks disposed on upper, lower, left, and right sides. The four circle marks include a black circle mark disposed on the upper side indicating the currently set orientation of the image, i.e., the top of the raster image, and the other three white circle marks represent correction candidates for the orientation of the image. When the white circle mark disposed on the lower side is pressed by the user to correct the orientation of the image, the reception unit detects the reception of the orientation of the image designated by the user, and notifies the UI control unit of information about the designated orientation. Then, the UI control unit stores the information about the notified orientation, and displays the information on the display unit of a screen 640. Thus, the designation of the orientation of the image by the user corresponds to the instruction to rotate the print image in accordance with the setting made in step S4006. The setting on the screen 630 corresponds to an instruction to rotate the print image 180° set on the screen 620.

The screen 640 displays the downsized version with the top and bottom reversed that has been displayed on the screen area 631. In the image displayed on the screen 640, the white circle mark pressed by the user is displayed as a black circle mark, and the circle mark that has been black is displayed as a white circle mark. The black circle mark indicates the top of the raster image as in the screen 630. Thus, the screen 640 indicates that the top of the raster image is set to the upper side of the letter "R". When the user presses the "OK" button 643 in this state, the reception unit notifies the UI control unit that the OK button has been pressed.

Upon receiving the notification, the control unit 301 notifies the rotation unit of the image processing circuit 209 of the information indicating the stored orientation to cause the rotation unit to rotate the downsized version so that the top is set to the side designated by the user. The UI control unit displays, on the display unit, the downsized version that has been rotated and information necessary for the user to check the orientation of the image, e.g., an image indicating the orientation of the envelope or the postcard, as in the screen 620. Here, a screen 650 including an image 651 indicating the print orientation of the raster image is displayed. The image 651 indicates that the top of the raster image is the upper side of the letter "R". The image 652 indicates the orientation of the "envelope", as in the case of the image 622. The screen 650 is different from the screen 620 in that the print orientation of the raster image, i.e., the orientation of the letter "R", matches the orientation of the envelope. When the user presses an "OK" button 655 in this state, the UI control unit stops displaying the screen 650, and the processing proceeds to step S4008.

The description on the processing in step S4007 was provided above. Next, the processing in step S4008 is described below.

In step S4008, the setting unit sets, i.e., finalizes, the orientation of the image finally designated by the user as the top of the image, i.e., the top of the raster image, and stores the information about the orientation.

In step S4009 following step S4004 or step S4005, first, the setting unit of the control unit 301 determines whether the top-bottom information is stored. When the top-bottom information is stored, that is, if the PDL data includes the top-bottom information, the setting unit sets the orientation indicated by the top-bottom information as the orientation of the image, and stores the information indicating the orientation. Otherwise, the setting unit sets the initial value of the top of the image as in step S4006, and stores the information indicating the initial value.

In step S4010, the rotation unit of the image processing circuit 209 that received the instruction from the control unit 301 rotates, based on the orientation of the sheet and the information stored in step S4008 or S4009, the raster image generated in step S4002. The information stored in step S4008 or S4009 indicates the top of the image set by the user instruction. In this rotation processing, the raster image is rotated to match the orientation of the sheet, e.g., the side of the flap of the envelope, while regarding the orientation of the image set in step S4008 or S4009 as the top of the image, i.e., upper side of the image. For example, the raster image is rotated considering the orientations of the top that was set and the flap side of the envelope so that both orientations agree with each other. The set top does not necessarily need to match the flap side of the envelope, and the raster image can be rotated in such a manner that its top is rotated 90° relative to the flap side. How much the top of the image, i.e., the orientation is rotated relative to the orientation of the sheet depends on the setting that can be made by the user. For example, in the screen 650 illustrated in FIG. 6, the lower side of the raster image including the upside down letter "R" is regarded as the top of the image, and the raster image is rotated 180°, so that the top matches the flap side of the envelope. When the set top of the image is on the left side of the raster image, the rotation unit rotates the raster image 90° in a clockwise direction. The control unit 301 transmits the raster image after the rotation and the information about the sheet feeder selected in step S4003, to the printer.

In step S4011, the sheet feed unit of the printer 212 feeds a sheet from a sheet feeder to the print unit based on the information about the sheet feeder, and the print unit prints the image on the sheet thus fed, based on the raster image obtained after the rotation.

The processing flow of the print processing according to the present exemplary embodiment is as described above.

Thus, when a sheet of a predetermined type is used for which the orientation of the image is important relative to the orientation of the sheet, the image can be printed in an orientation desired by the user because the top of the image can be set according to the user instruction.

In the present exemplary embodiment, the top of the image can be set based on the user instruction only with respect to a predetermined type of sheet. Alternatively, the processing may proceed directly from step S4003 to step S4005 while omitting the processing in step S4004. In such a case, the following processing is preferably added to the processing in step S4005.

If the type of the sheet is determined not to be the predetermined type of sheet, and the top-bottom information is stored, the processing proceeds to step S4009. If the type of the sheet is determined not to be the predetermined type of sheet and the top-bottom information is not stored, the processing proceeds to step S4006.

In this configuration, the top of the image can be set, if no top-bottom information is included, according to the user instruction even for a sheet of a type different from the predetermined type of sheet.

(Modification)

In the above-described exemplary embodiment, the display unit displays the downsized version of the print image based on the received image data and the top of the image designated by the user as illustrated in FIG. 6. Thus, the user can set the top of the image while recognizing the print orientation of the image to be printed. In another embodiment, a reduced image 630-2 is displayed in a rotated state based on the initial value, as illustrated in a screen 630-1 in FIG. 7. The screen 630-1 is displayed on the operation unit 211 in place of the UI screen 630 in FIG. 6. The image 630-2 indicates the top of the image set by the user pressing the "OK" button. This indicates that the upper side of the image 630-2 being displayed is set as the top of the image. The UI control unit also displays a "change orientation" button 630-3 on the display unit. The "change orientation" button 630-3 is pressed by the user to change the top of the image. When the button is pressed, the UI control unit displays a screen 635-1 including an image 635-2 obtained by rotating the downsized version 90° in the counterclockwise direction on the display unit. The downsized version is rotated by the rotation unit.

Then, when the user presses a "change orientation" button 635-3, the UI control unit displays a screen 640-1 on the display unit. The screen 640-1 includes an image 640-2 obtained by rotating the image 635-2 90° in the counterclockwise direction. When the user presses an "OK" button 643 on the screen 640-1, the top of the raster image is set to be in the orientation indicated by the image 640-2, that is, the upper side. As a result, the top of the raster image is rotated 180° from the original orientation.

When the "OK" button 643 is pressed, the UI control unit displays the screen 650 illustrated in FIG. 6 on the display unit. The other configurations are the same as those in the above-described exemplary embodiment, and thus the description thereof is omitted. As described, the downsized version rotates every time the user presses the "orientation change" button, and thus the user can intuitively set the top of the image while recognizing the top of the image to be printed on the sheet.

(Other Exemplary Embodiments)

The image forming device described in the above exemplary embodiment enables the user to designate the top of image data (PDL) data received from an external device via wireless communications. In another embodiment, the image forming device can include a scanner that can enable the user, as in the exemplary embodiment described above, to designate the top of image data of an original read by the scanner, and rotate the image data based on the designated top and the orientation of the sheet to print the image data.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-016361, filed Jan. 29, 2016, which is hereby incorporated by reference herein in its entirety.

What is claimed is:

1. A printing device configured to print an image based on print data, comprising:
   a print unit;
   a network interface configured to receive the print data from an external computer;
   at least one processor that causes a display unit to display a preview image generated from the received print data and representing a content of the image to be printed on a recording medium, wherein the preview image is displayed with an input portion in a state where it is determined that the received print data does not have an instruction setting an orientation of the received print data designated by a user, the input potion is for inputting an instruction of setting an orientation for the received print data from a user and causes the print unit to print the content of the image on the recording medium in the orientation set by the instruction input via the input portion by the user; and
   in a state where it is determined that the received print data has an instruction of setting an orientation of the received print data designated by a user,
   cause the print unit to print the content of the image on the recording medium in the orientation in accordance with the instruction originally set in the received print data without displaying the input portion.

2. The printing device according to claim 1, further comprising an image processing circuit configured to rotate the image of the received print data, in accordance with the received instruction of setting the orientation of the content, wherein the print unit prints the rotated image on the recording medium.

3. The printing device according to claim 1,
   wherein the displayed preview image indicates a currently set top of the received print data,
   wherein the user interface is configured to receive, as the instruction of setting the orientation of the content from a user, designation of a top of the content, and
   wherein the controller is further configured to rotate the image of the received print data, in accordance with the received designation of the top of the content, so that the orientation of the content of the image with respect to the recording medium is desirable for the user.

4. The printing device according to claim 3,
   wherein the user interface is further configured to set, before the print data is received, an initial top of a content of an image of print data received by the network interface, and
   wherein the user interface is configured to display initially the preview image of print data-in an orientation determined by the set initial top of a content of an image.

5. The printing device according to claim 1, wherein the controller is configured to determine whether to cause the user interface to display the preview image and the user interface to receive the instruction of setting the orientation of the content at least based on a type of a communication protocol used when the print data is received or a format of the print data.

6. The printing device according to claim 5, wherein, if the controller does not determine to cause the user interface to display the preview image and the user interface to receive the instruction of setting the orientation of the content, the print unit prints the content of the image of the received print data without requiring an instruction of setting the orientation of the content of the received print data.

7. The printing device according to claim 6, wherein the information included in the print data is at least one of a recording medium type on which the print data is printed or top-bottom information about the print data.

8. The printing device according to claim 5, wherein the controller is configured to cause the user interface to display the preview image and the user interface to receive the instruction of setting the orientation of the content if the recording medium type on which the print data is printed is a specific type.

9. The printing device according to claim 8, wherein the recording medium of the specific type is at least one of a letter or an envelope.

10. The printing device according to claim 1, wherein the print data is transmitted via wireless communication by a print application on the external computer.

11. The printing device according to claim 1, wherein the controller is configured to generate the preview image from the received print data to display on the display device.

12. The printing device according to claim 1, wherein the user interface is configured to receive the instruction of setting the orientation of the content from the user in the state where the preview image representing the content is displayed after the network interface receives the print data.

13. The printing device according to claim 1, wherein the orientation of the content with respect to the recording medium is an orientation of the content with respect to an orientation of the recording medium.

14. The printing device according to claim 1, wherein the orientation of the content with respect to the recording medium is one of four orientations of up, down, left, and right.

15. The printing device according to claim 1, wherein the controller is configured to cause the user interface to display the preview image and receive the instruction of setting the orientation of the content in accordance with a type of the recording medium and with whether or not the print data includes information on the orientation of the content of the image.

16. The printing device according to claim 1, wherein the controller is configured to cause the user interface to display the preview image and receive the instruction of setting the orientation of the content in accordance with a type of the recording medium and with a communication protocol used for receiving the print data.

17. The printing device according to claim 1, wherein the controller is configured to cause the user interface to display the preview image and receive the instruction of setting the orientation of the content in accordance with a type of the recording medium and with a data format of the print data.

18. The printing device according to claim 1, wherein the controller is configured to, on a basis of a type of the recording medium, control the user interface not to display the preview image or receive the instruction of setting the orientation of the content.

19. The printing device according to claim 1,
wherein the user interface is configured to display four objects respectively on upper, lower, left, and right sides of the preview image and receive the instruction of setting the orientation of the content on a basis of selection of one of the four displayed objects by the user, and
wherein the four objects respectively correspond to four orientations of the content of the image with respect to the recording medium.

20. The printing device according to claim 1,
wherein the user interface is configured to display an object pushed by the user to rotate the preview image and to set the orientation of the content of the image to be printed with respect to the recording medium, and receive the instruction of setting the orientation of the content in accordance with selection of the object by the user, and
wherein the preview image is rotated by 90 degree each time the object is pushed by the user, and an orientation of the content represented by the preview image rotated in accordance with the selection of the object corresponds to the orientation of the content of the image with respect to the recording medium.

21. The printing device according to claim 1, wherein the user interface is further configured to display the preview image representing the content of the image to be printed on the recording medium and rotated in accordance with the instruction from the user, and an image of the recording medium, so that the orientation of the content of the image to be printed on the recording medium is distinguishable to the user with respect to an orientation of the recording medium.

22. The printing device according to claim 21, wherein, if the recording medium is an envelope, the user interface displays an image of the envelope as the image of the recording medium, in a manner such that the image of the envelope has an image of a flap of the envelope, so that the orientation of the content of the image to be printed on the envelope is distinguishable to the user with respect to the orientation of the envelope.

23. The printing device according to claim 1, wherein it is not determined that the received print data is the received print data has an instruction of setting an orientation of the received print data designated by a user at least in a state where the received data is received via IPP or HTTP.

24. The printing device according to claim 1, wherein it is not determined that the received print data is the received print data has an instruction of setting an orientation of the received print data designated by a user at least in a state where the received data is received via WSD and the received print data is in XPS.

25. A method of controlling a printing device to print an image based on print data, the method comprising:
receiving, via an network interface of the printing device, the print data from an external computer;
generating, from the received print data, a preview image representing a content of the image to be printed;
causing, a display device of the printing device to display the preview image representing the content of the image to be printed with an input portion in a state where it is determined that the received print data does not have an instruction setting an orientation of the received print data designated by a user, the input potion is for inputting an instruction of setting an orientation for the received print data from a user and causes the print unit to print the content of the image on the recording medium in the orientation set by the instruction input via the input portion by the user; and
printing, in a state where it is determined that the received print data has an instruction of setting an orientation of the received print data designated by a user, the content of the image on the recording medium in the orientation set in accordance with the instruction originally set in the received print data without displaying the input portion.

26. The method according to claim 25, further comprising:
rotating the image of the received print data in accordance with the received instruction of setting the orientation of the content,
wherein the printing prints the rotated image on the recording medium so that the orientation of the content with respect to the recording medium is desirable for the user.

27. The method according to claim 25, wherein the print data transmitted is transmitted via wireless communication by a print application on the external computer.

28. A printing device configured to print an image based on print data, comprising:
a print unit;
a network interface configured to receive the print data from an external computer;
at least one processor cause a display unit display a preview image generated from the received print data and representing a content of the image to be printed on a recording medium wherein the preview image is displayed with an input portion in a state where the network interface receives the print data via a predetermined printing communication protocol, wherein the input portion is for inputting an instruction of setting an orientation for the received print data from a user and cause the print unit to print the content of the image on the recording medium in the orientation set by the input via the input portion by the user, and
in a state where the network interface receives the print data via a printing communication protocol which is different from the predetermined printing communication protocol, cause the print unit to print the content of the image on the recording medium in the orientation in accordance with the instruction originally set in the received print data without displaying the input portion.

29. The printing device according to claim 28, wherein the predetermined printing communication protocol is IPP or HTTP.

* * * * *